United States Patent [19]
Opheij et al.

[11] Patent Number: 4,924,079
[45] Date of Patent: May 8, 1990

[54] APPARATUS FOR OPTICALLY SCANNING AN INFORMATION PLANE

[75] Inventors: Willem G. Opheij; Peter Coops; Adrianus J. Duijvestijn, all of Eindhoven; Dirk C. Van Eck, Nijmegen; Peter De Zoeten, Eindhoven, all of Netherlands

[73] Assignee: U.S. Philips Corporation, New York, N.Y.

[21] Appl. No.: 345,493

[22] Filed: May 1, 1989

[30] Foreign Application Priority Data

Dec. 5, 1988 [NL] Netherlands .......................... 8802988

[51] Int. Cl.$^5$ ................................................ G01J 1/20
[52] U.S. Cl. ................................ 250/201.5; 369/44.11
[58] Field of Search ........................ 250/201 DF, 201; 369/45, 46

[56] References Cited

U.S. PATENT DOCUMENTS 4,498,159 2/1985 Daimon .................................. 369/46
4,612,437 9/1986 Ohsato .......................... 250/201 DF
4,733,065 3/1988 Hoshi ................................... 250/201

Primary Examiner—David C. Nelms
Assistant Examiner—Sherrie Hsia
Attorney, Agent, or Firm—John Francis Moran; Leroy Eason

[57] ABSTRACT

An optical scanning apparatus, which includes a radiation source (7) supplying a scaning beam ($b_1$), an objective system (8) for focusing the scanning beam ($b_1$) to a scanning spot ($S_1$) in an information plane (2) to be scanned, and a first diffraction element (9) for deforming the beam reflected by the informatin plane (2) in such a way that a focus-error signal can be derived therefrom. The apparatus also includes a second diffraction element (10) for forming two auxiliary beams ($b_2$, $b_3$) by means of which a tracking-error signal can be derived, which second diffraction element has such a size and is arranged at such position that the beams originating from the first diffraction element (9) do not traverse the second diffraction element.

36 Claims, 14 Drawing Sheets

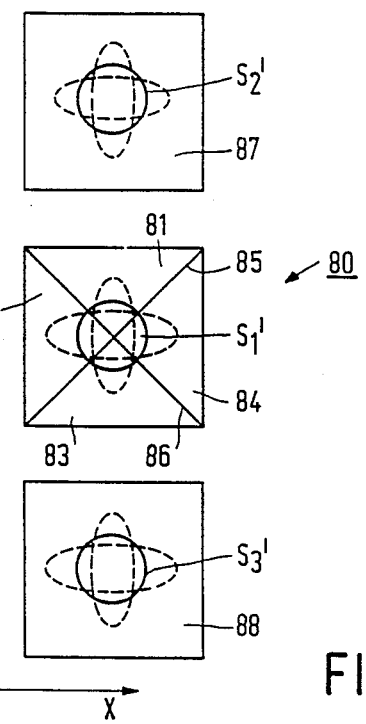
FIG.20
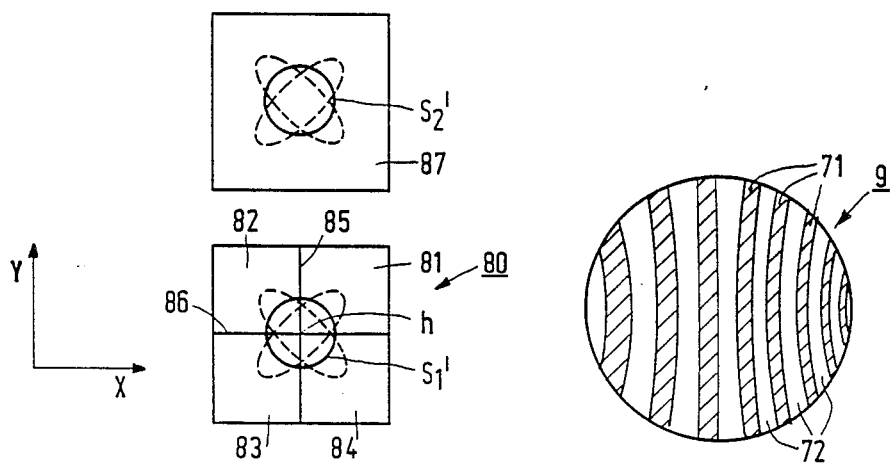
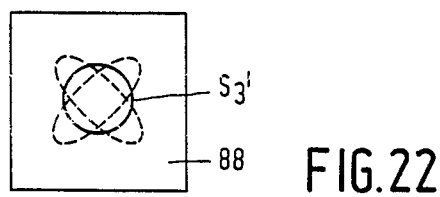
FIG.21
FIG.22

APPARATUS FOR OPTICALLY SCANNING AN INFORMATION PLANE

BACKGROUND OF THE INVENTION

1. Field of the Invention

The invention relates to an apparatus for optically scanning a radiation-reflecting information plane, which apparatus comprises a radiation source supplying a scanning beam, an objective system for focusing the scanning beam to a scanning spot in the information plane and for re-imaging the scanning spot on a composite radition-sensitive detection system, and a first diffraction element arranged in the radiation path between the radiation source and the objective system for deflecting a part of the radiation reflected by the information plane to the radiation-sensitive detection system and for deforming the diffracted beam in such a way that a focus-error signal can be derived therefrom by means of the composite detection system.

A focus-error signal is a signal which is proportional to a deviation between the focusing plane of the objective system and the information plane.

The deflected sub-beam may be deformed by splitting the beam into, for example, two sub-beams each of which has a separate detector pair of the composite detection system associated with it. Another possibility is to render the beam astigmatic, which beam cooperates with four detectors arranged in four different quadrants in the detection system.

2. Description of the Related Art

An apparatus of this type, which is in principle suitable for reading information recorded in an optical record carrier and for optically inscribing such a record carrier, is known from U.S. Pat. No. 4,665,310. In this apparatus the composite diffraction element, in the form of a diffraction grating, fulfils two functions for which otherwise two separate elements must be used. In the first place the grating ensures that the radiation reflected by the information plane and passing through the objective system is defected from the path of the radiation emitted by the diode laser so that a detection system can be placed in the path of the reflected radiation. In the second place the grating splits the reflected beam into two sub-beams which are required for generating a focus-error signal, i.e. a signal comprising information about the magnitude and the direction of a deviation between the focusing plane of the objective system and the information plane. A separate detector pair is associated with each sub-beam, the difference signal between the output signals of the detectors associated with the same pair being a measure of focusing the scanning beam on the information plane.

In addition to a focus-error signal, a tracking-error signal must also be generated in the apparatuses considered. A tracking error is a deviation between the centre of the radiation distribution of the scanning spot and the centre of an information track portion to be read or a track portion to be written. In the apparatus according to U.S. Pat. No. 4,665,310 a tracking error is detected by means of the same detectors with which also a focusing error is detected.

To this end the diffraction grating in the known apparatus is oriented in such a way that the bounding line between two sub-gratings of which the grating is composed is parallel to the track direction at the area of the scanning spot. The tracking-error signal is obtained by determining the sum of the output signals of each detector pair and by subtracting these sum signals from each other. In the so-called single-spot system according to U.S. Pat. No. 4,665,310 deviations, or so-called offsets, may occur in the tracking-error signal, inter alia as a result of an asymmetrical energy distribution within the scanning beam. The tracking servo system which is used to keep the scanning spot centred on the track may be a so-called two-stage system. In such a system the coarse adjustment of the scanning spot is realised by displacing a slide supporting, for example, the radiation source and the objective system, relative to the tracks. The fine adjustment of the scanning spot is realised by displacing, for example the objective system relative to the slide. This displacement may cause a further deviation in the tracking-error signal. To prevent this deviation, or to compensate for it, extra measures have to be taken in practice. Moreover, when using the same detectors for generating a focus-error signal as well as a tracking-error signal, a focusing error may affect the tracking-error signal, or conversely, a tracking error may affect the focus-error signal.

SUMMARY OF THE INVENTION

The present invention has for its object to provide an apparatus of the type described in the opening paragraph which does not have the above-mentioned drawbacks and which comprises a novel combination of a focus-error detection system and a tracking-error detection system. This apparatus is characterized in that a second, single diffraction element is arranged between the radiation source and the first diffraction element for splitting the beam supplied by the radiation source into the scanning beam and two auxiliary beams which form the scanning spot and two auxiliary spots, respectively, in the information plane, in that the composite detection system comprises extra detectors for the re-imaged auxiliary spots and in that the second diffraction element is so small and is arranged at such position that the beams diffracted by the first diffraction element do not reach the second diffraction element.

By using two auxiliary beams which cooperate with separate detectors, the generation of the tracking-error signal can be decoupled from the generation of the focus-error signal so that the risk of crosstalk between these signals is reduced. The bounding line within the composite diffraction element no longer needs to be parallel to the track direction so that the risk of a tracking error affecting the focus-error signal is reduced. Moreover, this provides an extra degree of freedom in the design.

It is to be noted that U.S. Pat. No. 3,876,842 describes a scanning apparatus in which a diffraction grating is used to form a scanning beam and two auxiliary beams, while a separate detector is associated with each auxiliary beam and in which these auxiliary beams are used for generating a tracking-error signal. However, this known apparatus does not use a composite diffraction element for separating the beam coming from the record carrier and the beam going to the record carrier as well as for giving the deflected beam a suitable shape for focus-error detection.

An essential part of the present invention is that the single diffraction element is so small and is arranged at such position between the radiation source and the composite diffraction element that the radiation coming from the last-mentioned element and directed towards the detection system is not split up into further sub-beams by the single diffraction element. Consequently, the number of radiation spots formed on the detection system is limited so that the geometry of this system remains relatively simple. Moreover, the energy in the radiation spots which are required for generating the different signals is still sufficiently large.

There are two classes of embodiments of the apparatus according to the invention. The first class is generally characterized in that the two diffraction elements are radiation-transmissive. The diffraction elements are then placed one above the other and together with other components such as the radiation sources and the detection system they can be arranged in one narrow tubular holder.

The embodiments of the second class are generally characterized in that at least one of the two diffraction elements is a reflecting element.

A first embodiment of the second class is characterized in that the first diffraction element is reflecting and the second diffraction element is radiation-transmissive.

The first diffraction element then also functions as a folding mirror so that the height of the scanning apparatus can be limited.

A second embodiment of the second class is characterized in that the first diffraction element is radiation-transmissive and the second diffraction element is reflecting.

The second diffraction element may then form part of a larger reflecting element which reflects radiation deflected by the first diffraction element outside the second diffraction element towards the radiation-sensitive detection system.

A third embodiment of the second class is characterized in that both the first and the second diffraction element are reflecting.

The two diffraction elements then function as folding mirrors so that the height of the scanning apparatus can be limited to a minimum.

In the apparatus in which the invention is used the radiation source is preferably a diode laser and the radiation-sensitive detection system comprises a composite photodiode, the laser diode and the photodiode being arranged on one block at one side of a housing, which housing has a radiation window at the opposite side. If the first and the second diffraction element are radiation-transmissive, this apparatus may be characterized in that the second diffraction element is incorporated in the housing and in that the first diffraction element is fixedly connected to the radiation-transmissive side of the housing.

The first diffraction element may be located at some distance from the radiation window of the housing and may be connected to this housing via a ring. Another possibility is that this diffraction element is arranged on the radiation window. It is also possible for the first diffraction element to form a portion of the radiation window. The said first housing may be fixed within a second housing which in its turn has a radiation window. The first diffraction element may then be arranged on this window or may be part of this window.

The scanning apparatus can be given a compact form by using the said constructive possibilities.

An embodiment of this apparatus which is advantageous as far as assembly is concerned is further characterized in that a collimator lens is fixedly connected to the housing.

This collimator lens can be fixedly connected, via a ring, to the first housing on which or in which the first diffraction element is arranged. It is alternatively possible for the collimator lens to constitute the radiation-transparent closure of a second housing within which the first housing is fixed. If the first diffraction element forms part of a second housing, the collimator lens may be the radiation-transparent closure of a third housing within which the second housing is fixed.

In this apparatus an objective system is arranged in the radiation path behind the collimator lens. As described in U.S. Pat. No. 4,668,056 this objective system may be a single lens having at least one aspherical surface, which single lens can also take over the function of the collimator lens. The technique described in U.S. Pat. No. 4,668,056 can be used to improve the apparatus according to the invention as regards its compactness and simplicity of assembly. Such an apparatus is characterized in that an objective system in the form of a single objective lens is fixedly connected to the housing.

This single objective lens may be connected to the housing in the same manners as described above for the collimator lens.

Different focus-error detection methods can be used in the apparatus according to the invention. A first possibility is utilized in an embodiment which is characterized in that the second diffraction element is a diffraction grating having a constant grating period and whose grating strips are substantially transverse to the effective track direction, in that the first diffraction element is a diffraction grating having a varying grating period and in that the composite detection system comprises four detectors which are arranged in four different quadrants around the chief ray of the scanning beam deflected by the first diffracting grating, the shape of the re-imaged scanning spot being determined by means of said detectors.

The term effective track direction, which is used in this description in connection with the diffraction grating as well as the composite detection system, is understood to mean the direction of the track portion projection, on the relevant element, of the track portion located at the area of the scanning spot. Since the grating strips of the second diffraction grating extend at an angle of almost 90° to the effective track direction, the auxiliary spots formed in the information plane by the auxiliary beams formed by this grating are located one behind the other in the track direction. By causing the said angle to deviate by several degrees from 90° it is achieved that one of the auxiliary spots is located on a first edge and the other auxiliary spot is located on the second edge of the track.

The grating having the varying grating period converts the diffracted scanning beam into an astigmatic beam and the shape of the re-imaged scanning spot is determined by the degree of focusing of the scanning beam on the information plane.

In the case of a focus error this scanning spot is deformed to an elliptical spot whose major axis, dependent on the defocusing sign, is located in one of the two mutually perpendicular directions, hereinafter referred to as astigmatic directions. The separating strips within the four-quadrant detector extend at angles of approximately 45° to the astigmatic directions.

A first embodiment of a scanning apparatus comprising an astigmatic first grating is characterized in that the first grating has straight grating strips and a linearly varying grating period.

In this embodiment the astigmatic directions are parallel or transverse to the direction of the grating strips of the first grating. If the grating strips are parallel, or transverse to the effective track direction, the separating strips extend at angles of 45° to the effective track direction. A tracking error may then affect the focus-error signal.

This is prevented in a scanning apparatus which is characterized in that the separating strips of the first grating are curved and in that the separating strips between the four detectors of the four-quadrant detector are parallel, respectively transverse, to the effective track direction.

This special grating, also referred to as hologram, which not only has curved strips but also a non-linear variation of the period, displaces the astigmatic directions so that the separating strips in the four-quadrant detector may be parallel respectively transverse to the effective track direction, thus preventing crosstalk of a tracking error in the focus-error signal.

It is to be noted that the use of a grating having a linearly varying grating period in combination with a four-quadrant detector for generating a focus-error signal is known per se from U.S. Pat. No. 4,358,200. However, the apparatus according to this patent does not comprise a second diffraction grating for forming two auxiliary beams.

A second possibility of focus-error detection, which is preferred to the above-mentioned so-called astigmatic method as far as temperature sensitivity and ease of control are concerned, is realised in an embodiment which is characterized in that the first diffraction element is a composite grating comprising two sub-gratings and splitting the deflected scanning beam into two sub-beams, and in that the composite detection system comprises two detector pairs, the first and second sub-beam cooperating with a first and a second detector pair, respectively.

In this apparatus the scanning spot is re-imaged in two radiation spots on the detector pairs. Each of these radiation spots is displaced transversely of the separating strip of the associated detector pair in dependence upon a focusing error of the scanning beam relative to the information plane. This displacement can be detected by comparing the output signals of the detectors. This focus-error detection method is known as the double Foucault method.

A preferred embodiment of the last-mentioned apparatus is characterized in that the sub-gratings have a varying grating period and in that the grating strips of the sub-gratings are curved.

Due to the varying grating period and the curved grating strips, the composite grating has a lens action and by displacing this grating in the direction of the bounding line of the sub-gratings the energy distribution of the radiation spots can be rendered symmetrical relative to the associated detector pairs, inter alia because the imaging distance of the assembly of objective system and the grating is adapted to the distance, in the direction of the optical axis, between the diode laser and the detectors. This is particularly important if the detectors, in the form of photodiodes, and the diode laser are combined in one component and are fixed relative to each other. A composite grating having varying grating periods and curved grating strips, which grating is also referred to as hologram, provides the possibility of correcting for imaging errors such as coma and astigmatism which may occur when using a grating with straight grating strips.

In principle there are two embodiments of a scanning apparatus using the Foucault focus-error detection method. The first embodiment is characterized in that the grating strips of the one sub-grating have the same main direction as those of the other sub-grating, in that the average grating periods of the sub-gratings are different, and in that the detector pairs are juxtaposed in a direction parallel to the bounding line between the sub-gratings. In this embodiment the sub-beams of the scanning beam are diffracted in the same direction but at different angles.

The second embodiment is characterized in that the sub-gratings have the same average grating period, while the main directions of the grating strips of the one sub-grating extend at a first angle and those of the other sub-grating extend at a second angle to the bounding line of the two sub-gratings, and in that the detector pairs are juxtaposed in a direction transversely of the direction of the said bounding line. Now the sub-beams of the scanning beam are preferably diffracted at the same angles but in different directions. This embodiment is preferred to the previous embodiment due to its better assembly tolerances, adjusting facilities and stability.

A third embodiment of the scanning apparatus using the Foucault focus-error detection method is characterized in that the main direction of the grating strips of the first sub-grating extend at a first angle and those of the grating strips of the second sub-grating extend at a second angle to the bounding line between the sub-gratings, in that the average grating periods of the two sub-gratings are different and in that the detector pairs occupy different positions both in a direction parallel and in a direction perpendicular to the said bounding line.

This embodiment can be considered to be a combination of the last-mentioned first and second embodiments.

Different embodiments are possible for the scanning apparatus using the Foucault focus-error detection method as far as the mutual positions of the detectors of the composite detection system are concerned, which positions are dependent on the directions of the grating strips of the first and second diffraction gratings and on the angles at which these gratings deflect the beams.

A first embodiment is characterized in that in the composite detection system, viewed in the direction transverse to the effective track direction, a first and a second detector for receiving the first and the second auxiliary beam are located on a first and a second side, respectively of the two juxtaposed detector pairs.

In this embodiment the angles at which the first diffraction grating deflects the sub-scanning beams are smaller than the angles at which the second diffraction grating deflects the auxiliary beams.

An embodiment in which this is not the case and in which there is a greater freedom of choice of the diffraction angles of the first diffraction grating is characterized in that in the composite radiation-sensitive detection system a first and second, and a third and fourth detector are provided for the first and second auxiliary beams, respectively, which are each split into two sub-beams by the first diffraction grating and in which, viewed in the direction transverse to the effective track direction, the four detectors and the two detector pairs are juxtaposed in the sequence: first detector, first detector pair, third detector, second detector, second detector pair and fourth detector.

An embodiment which is an alternative as far as the freedom of choice of the diffraction angles of the first diffraction grating is concerned, is characterized in that the grating strips of the first diffraction grating are substantially parallel to those of the second diffraction grating and in that, viewed in the effective track direction, a first detector for the first auxiliary beam and a second detector for the second auxiliary beam are located on different sides of the two detector pairs, which pairs are juxtaposed, viewed in the direction transverse to the track direction.

A further alternative embodiment of the apparatus in which the detector pairs occupy different positions both in a direction parallel to and in a direction transverse to the effective track direction is characterized in that in the composite detection system a first and second, and a third and fourth detector are provided for the first and second auxiliary beams, respectively, which are each split into two auxiliary sub-beams by the first diffraction grating and in which, viewed in directions transverse to the effective track direction, the first and third detectors are located on either side of the first detector pair and the second and fourth detectors are located on either side of the second detector pair.

Another embodiment of the apparatus in which the detector pairs are juxtaposed in a direction parallel to the effective track direction is characterized in that in the composite detection system a first and second, and a third and fourth detector are provided for the first and second auxiliary beams, respectively, which are each split into two auxiliary sub-beams by the first diffraction grating and in which, viewed in directions transverse to the effective track direction, the first and third detectors are located on either side of the first detector pair and the second and fourth detectors are located on either side of the second detector pair.

Satisfactory experience has been gained in practice with scanning apparatuses comprising a diffraction grating for generating a scanning beam and two auxiliary beams and scanning apparatuses comprising a diffraction grating for beam separation and for focus-error detection. However, it has been found that when using a grating a deviation may occur, notably in the generated focus-error signal, which deviation, it is true, remains within the range of tolerances laid down for this signal, but leaves only little room for possible other deivations. The last-mentioned deviations may not only be static deviations, inter alia due to assembly inaccuracies but also dynamic deviations which may occur due to movements of the optical components with respect to one another and due to varying adjustments in the electronic processing circuit.

As is known, the wavelength λ of the radiation beams emitted by diode lasers, which are often used in practice, may vary, for example due to temperature variations. Furthermore, the wavelengths of individual diode lasers, which have been manufactured at different instants while using the same process, may be mutually different. A wavelength variation of the scanning beam results in a change of the angles at which the sub-beams are diffracted by the sub-gratings, resulting in a change of the positions of the radiation spots on the detector pairs.

To prevent these changes in position from affecting the generated focus-error signal, the scanning apparatus is further characterized in that for each detector pair the separating strip between the two detectors extends at an acute angle to the line connecting the centre of the radiation-emitting surface of the diode laser to the position occupied by the centre of the intensity distribution of the radiation spot formed on the relevant detector pair, if the scanning beam is focused on the information plane to an optimum degree.

The separating strip of each detector pair is located in such a way that the displacement of the centre of the intensity distribution of the associated radiation spot, which results from the wavelength variation, is effected along this separating strip so that this displacement does not result in a change of the intensity distribution across the detectors and therefore does not affect the focus-error signal.

When using a composite detection system with oblique separating strips within the detector pairs, the distance, measured along the said bounding line, between the centre of the two detector pairs and the centre of the radiation-emitting surface of the diode laser should be adjusted very accurately and therefore another possibility is preferably used for correcting wavelength variations. A scanning apparatus using this possibility is characterized in that the separating strips of the two detector pairs are in principle parallel to a line connecting the centre of the radiation-emitting surface of the diode laser to the centre of the composite radiation-sensitive detection system. This system with straight separating strips within the detector pairs provides the possibility of wider tolerances for the positions of the optical elements in the scanning apparatus.

BRIEF DESCRIPTION OF THE DRAWINGS

Embodiments of the invention will now be described in greater detail with reference to the accompanying drawings in which FIG. 20 shows the composite detection system associated with this grating, FIG. 21 shows a second embodiment of an astigmatic grating, FIG. 22 shows the composite detection system associated with this grating.

DESCRIPTION OF THE PREFERRED EMBODIMENTS

Figure 1:
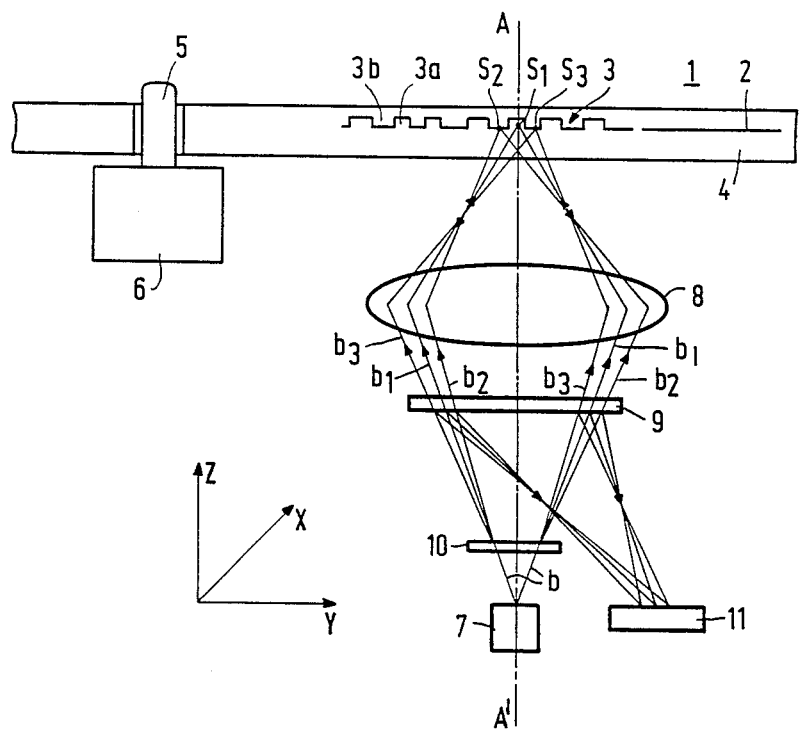
FIG. 1 shows diagrammatically an apparatus according to the invention.

In FIG. 1 a small portion of an optical record carrier 1 with a radiation-reflecting information plane 2 is shown in a tangential section. This figure shows one of the information tracks 3 which tracks alternate with lands 4, which are not shown. An information track 3 comprises a plurality of information areas 3a alternating in the track direction with intermediate areas 3b. The information is recorded in the succession of the information areas and intermediate areas in the track direction. The information plane is scanned by a beam b emitted by a radiation source 7, for example a diode laser. This beam is focused to a small scanning spot $S_1$ in the information plane by an objective system 8, schematically represented by a single lens. The objective system may be preceded by a separate collimator lens. The imaging system may alternatively be formed by a combined collimator-objective system, as is shown in FIG. 1. As the record carrier is rotated about an axis 5, which is parallel to the optical axis AA', a track 3 is scanned and the read beam is modulated by the information contained in this track. The entire information plane is scanned by moving the record carrier and the read head, comprising the source 7, the objective system 8 and the detection system 11, in a radial direction relative to one another.

The beam which has been reflected and modulated by the information surface should be detected, so that this beam must be separated from the projected beam. Therefore, the apparatus should comprise a beam-separating element.

For reading an information structure with minute information details, for example of the order of 1 μm, an objective system having a large numerical aperture is required. The depth of focus of such an objective system is small. Since variations in the distance between the information plane 2 and the objective system 8 may occur which are larger than the depth of focus, steps have to be taken in order to detect these variations and, in response thereto, correct the focusing. To this end the apparatus may be provided with a beam splitter which splits the reflected beam into two sub-beams, and with, for example, two detector pairs a first pair of which cooperates with the first sub-beam and the second pair cooperates with the second sub-beam. The output signals of the detectors are processed to form, inter alia a focus-servo signal.

As described in U.S. Pat. No. 4,665,310 beam separation and beam splitting can be effected by means of a single element, namely a transparent grating. This grating splits the beam reflected by the information plane 2 and passing through the objective system 8 into a non-diffracted zero-order sub-beam and a plurality of first-order and higher order sub-beams. One of these beams, preferably a first-order sub-beam, is incident on the radiation-sensitive detection system 11 and is used for generating, inter alia a focus-error signal. The grating parameters, notably the ratio between the width of the grating strips and that of the intermediate grating strips and the depth and the shape of the grating grooves, may be chosen to be such that a maximum amount of radiation reaches the detection system.

Figure 2:
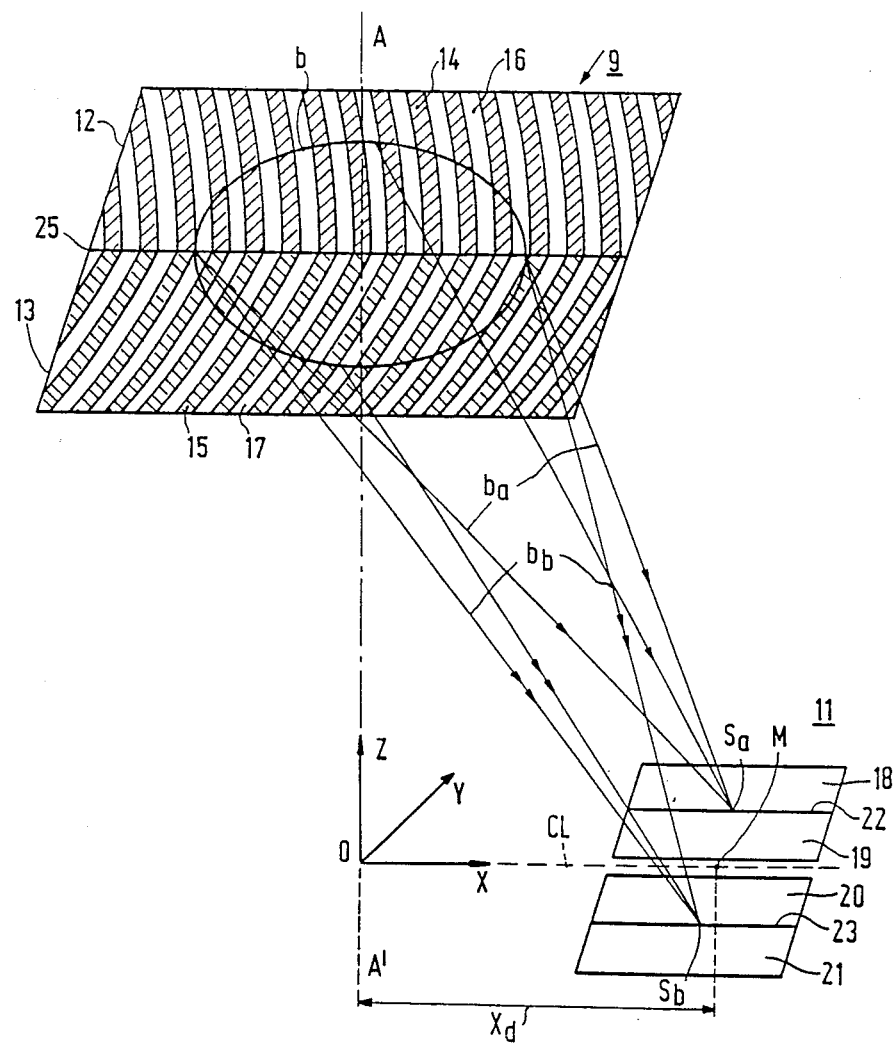
FIG. 2 is a perspective diagrammatical view of a first embodiment of a diffraction grating and the associated composite detection system for generating a focus-error signal.

FIG. 2 shows in a perspective elevational view a known radiation-sensitive detection system 11 and the associated grating 9. The beam b is shown by way of its cross-section at the area of the grating 9. This grating 9 comprises two sub-gratings 12 and 13 separated from each other by the line 25. The grating strips of the sub-gratings are denoted by the reference numerals 14 and 15, respectively. These grating strips are separated by intermediate strips 16 and 17. In this embodiment the sub-gratings have the same grating periods, but the main directions of the preferably curved grating strips 14 of the sub-grating 12 extend at a first angle to the bounding line 11, while the main directions of the curved grating strips 15 of the second sub-grating 13 extend at a second, perferably equally large but opposite angle to the bounding line. The sub-beams are substantially diffracted in a direction transversely of the main directions. Since the main directions are different, the sub-beams $b_a$ and $b_b$ are diffracted at different angles in the YZ plane. This means that in the plane of the detectors, the XY plane, the radiation spots $S_a$ and $S_b$ are displaced relative to each other in the Y direction. In this figure and in the other figures the references X, Y and Z are the axes of a system of coordinates whose origin O coincides with the centre of the radiation-emitting surface of the diode laser 7.

Figure 3A:
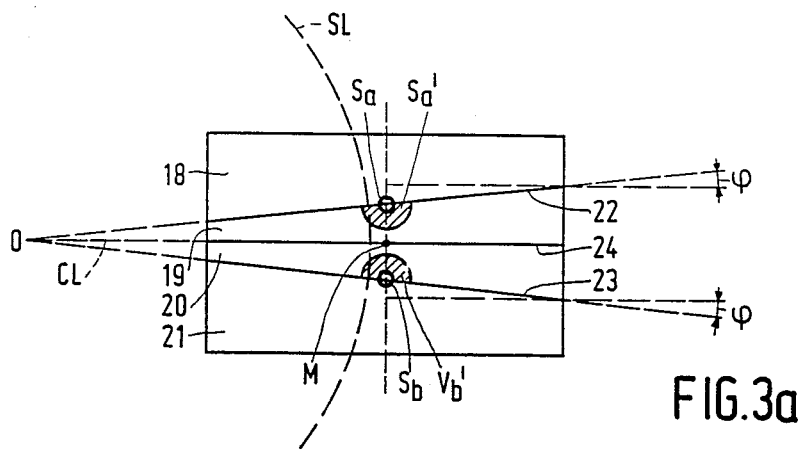
FIGS. 3a and 3b show the variations of the radiation spots on this detection system when focusing errors occur.
Figure 3B:
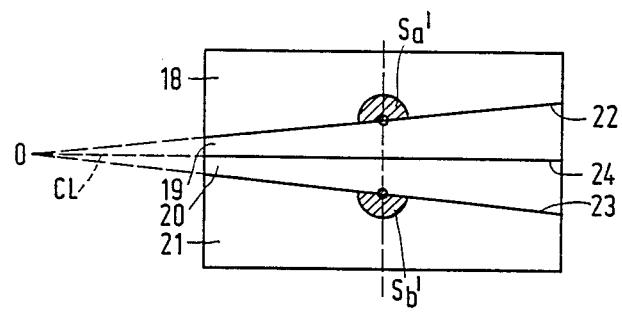

Radiation-sensitive detectors in the form of photodiodes 18, 19 and 20, 21, which are separated by narrow strips 22 and 23, are associated with each of the sub-beams $b_a$ and $b_b$, respectively. These detectors are positioned in such a way that in the case of a correct focusing of the beam b on the information plane 2 the intensity distribution of the radiation spots $S_a$ and $S_b$ formed by the sub-beams $b_a$ and $b_b$ is symmetrical relative to the detectors 18, 19 and 20, 21, respectively. When a focusing error occurs, the radiation spots $S_a$ and $S_b$ will become asymmetrically larger, as is shown in FIGS. 3a and 3b. This figure shows a known composite detector, i.e. a detector whose separating strips 22 and 23 extend at an angle $+\Psi$ and $-\Psi$, respectively, to the connection line CL between the point O and the centre M of the composite detector 11, which connection line coincides with the separating strip 24 between the detector pairs 18, 19 and 20, 21 in FIGS. 2 and 3. In FIG. 3a the focus of the beam b is situated in a plane in front of the information plane 2, while FIG. 3b shows the focus of the beam b situated in a plane behind the information plane.

If the output signals of the detectors 18, 19, 20 and 21 are represented by $S_{18}$, $S_{19}$, $S_{20}$ and $S_{21}$, respectively, the focus-error signal $S_f$ will be given by:

$$S_f = (S_{18} + S_{21}) - (S_{19} + S_{20})$$

A signal which is proportional to the information being read, or the information signal $S_i$ is given by:

$$S_i = S_{18} + S_{19} + S_{20} + S_{21}.$$

In addition to deviations in the focusing of the scanning beam, deviations between the centre of the scanning spot and the centre line of a scanned track should also be detected. The last-mentioned deviations cause a reduction of the amplitude of the information signal which has been read and crosstalk between juxtaposed tracks. Such a deviation, also referred to as tracking error, can be corrected by moving the complete read head or only the objective system in the radial direction, the X direction.

According to the present invention, the signal therefor, i.e. the tracking-error signal can be obtained by means of a second diffraction element, preferably a diffraction grating and an adapted radiation-sensitive detection system. The second grating is denoted by the reference numeral 10 in FIG. 1. As is shown in this figure, this grating splits a beam b into a non-diffracted zero-order beam $b_1$, a beam $b_2$ diffracted in the $+1$ order, a beam $b_3$ diffracted in the $-1$ order and into a plurality of diffracted higher order beams. The last-mentioned beams are not important for the present invention because they are largely diffracted outside the objective system 8 and have only a low intensity. The grating 10 is a single, i.e. undivided grating with straight grating lines and, for example a constant grating period. The parameters of this grating, notably the ratio between the width of the grating strips and that of the intermediate grating strips and the depth and the shape of the grating grooves may be chosen to be such that substantially all radiation of the incident beam b is transferred to the beams $b_1$, $b_2$ and $b_3$. Moreover, it can be ensured that the intensity of the beam $b_1$ is several times larger, for example 6 times than that of each beam $b_2$ and $b_3$.

The beam $b_1$ is the main beam or scanning beam and forms the scanning spot $S_1$ in the information plane 2. The beams $b_2$ and $b_3$ are auxiliary beams which are focused by the objective system 8 to two auxiliary spots $S_2$ and $S_3$ in the information plane. Since the auxiliary beams $b_2$ and $b_3$ are diffracted at opposite angles by the grating 10, the auxiliary spots $S_2$ and $S_3$, viewed in the track direction, are located on either side of the scanning spot $S_1$.

Figures 4A, 4B:
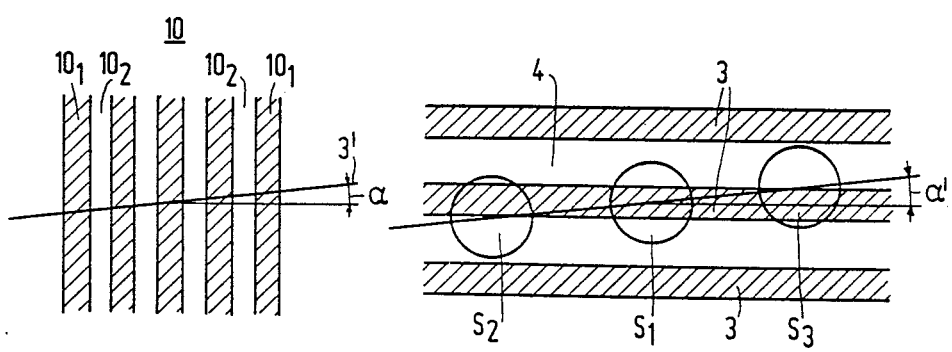
FIGS. 4a and 4b are plan views of the grating for forming the auxiliary beams and a portion of the track structure, respectively.

The angle between the direction of the grating strips of the grating 10 and the effective track direction is $90 - \alpha$, in which $\alpha$ is small as is shown in FIG. 4a. This figure shows a part of the grating 10 with grating strips $10_1$ and intermediate strips $10_2$ in a plan view. The line 3' is the projection, in the plane of the grating 10, of the centre line of the scanned track. This line represents the effective track direction. By suitable choice of the angle $\alpha$ it is achieved that, if the centre of the scanning spot $S_1$ is located on the centre line of the scanned track, the centre of the auxiliary spot $S_2$ is located on one edge of this track and the centre of the auxiliary spot $S_3$ is located on the other edge of this track, as is shown in FIG. 4b. In the radiation-sensitive detection system 11 a separate detector is present for each auxiliary beam. In the situation shown in FIG. 4b, in which the auxiliary spots $S_2$ and $S_3$ cover the track to an equal extent, the output signals of the said detectors are equal. When a tracking error occurs, the centre of one of the auxiliary spots is displaced towards the centre line of the track, while the centre of the other auxiliary spot moves away from the centre line and the output signals of the said separate detectors become unequal. The difference between the output signals of the detectors thus represents the tracking-error signal.

The scanning beam reflected by the information plane and the two auxiliary beams, of which only the peripheral rays are shown in FIG. 1, are incident on the first grating 9. This grating treats each of these beams in the same way as has been described with reference to FIG. 2 for the beam b. Each beam is mainly diffracted in the direction of the detection system 11 and is also split into two sub-beams. This split-up, which is effected in the Y direction, is shown separately in FIG. 5 for the sake of clarity. This figure shows the grating 9 comprising the two sub-gratings 12 and 13, which grating is rotated through 90° relative to that shown in FIG. 2. The cross-sections, at the area of the grating 9, of the reflected scanning beam and two auxiliary beams are denoted by the solid line circle $b_1$ and the half solid line and half broken line circles $b_2$ and $b_3$, respectively. The grating 9 splits each beam $b_1$, $b_2$, $b_3$ into two sub-beams $b_{1,1}$; $b_{1,2}$, $b_{2,1}$; $b_{2,2}$, and $b_{3,1}$; $b_{3,2}$, respectively. The sub-grating 12 deflects the sub-beams $b_{1,1}$; $b_{2,1}$ and $b_{3,1}$ to the right, which sub-beams are focused in the radiation spots $S_{1,1}$; $S_{2,1}$ and $S_{3,1}$ on the composite detector 11. The sub-grating 13 deflects the sub-beams $b_{1,2}$; $b_{2,2}$ and $b_{3,2}$ to the left, which sub-beams are focused in the radiation spots $S_{1,2}$; $S_{2,2}$ and $S_{3,2}$. The composite detector comprises two detector pairs 18, 19 and 20, 21 for the radiation spots $S_{1,1}$ and $S_{1,2}$ as well as one detector 30 for the radiation spots $S_{2,1}$ and $S_{2,2}$ and one detector 31 for the radiation spots $S_{3,1}$ and $S_{3,2}$.

FIG. 6 again shows the radiation spots formed and the associated detectors. This figure also shows how the radiation-emitting surface of the diode laser 7 is located relative to the composite detector. If the output signals of the detectors 30 and 31 are represented by $S_{30}$ and $S_{31}$, respectively, the tracking-error signal $S_r$ will be given by:

$$S_r = S_{30} - S_{31}.$$

The focus-error signal remains:

$$S_f = (S_{18} + S_{21}) - (S_{19} + S_{20})$$

and the information signal $S_i$ is now given by:

$$S_i = S_{18} + S_{19} + S_{20} + S_{21}.$$

It is characteristic of the apparatus according to the present invention that the number of radiation spots on the detectors is limited to the principally minimum number necessary for the required functions. It is achieved thereby that the detection system can remain relatively simple and that the intensity of the radiation spots on this system is sufficiently large so that the output signals of the detectors are sufficiently strong.

For the focus-error detection in accordance with the Foucault method the reflected scanning beam ($b_1$) should be split up into two sub-beams. Since the reflected auxiliary beams ($b_2$, $b_3$) must also pass through the composite grating 9, these beams are also inevitably split up into two sub-beams so that a total of six beams is produced. According to the invention special steps are taken to achieve that the number of beams is limited to this minimum number in spite of the fact that two diffraction gratings are arranged one behind the other in the radiation path.

In principle, the second grating (10) could be placed above the first grating (9). Then the three beams $b_1$, $b_2$, $b_3$ formed by the grating 10 would again pass through this grating after reflection by the record carrier and would be further split up into nine beams. These beams would subsequently have to pass through the grating 9, producing a total number of 18 beams. The number of beams can be limited by placing the grating 10 below the grating 9. Without further measures the number of beams would still become too large with this positioning. In fact, the beams from the grating 9 could then pass through the grating 10 and could be further split up so that more than six beams would be incident on the detection system. This can be prevented by placing the grating 10 in such a position, close to the radiation source 7, and by making it so small that the beams coming from the grating 9 and directed towards the detection system 11 no longer traverse the grating 10.

Measures have also been taken to prevent the laser beam from being split up too much on its projected path from the radiation source to the information plane. As already stated, it is ensured that the grating 10 concentrates the radiation as much as possible in the scanning beam and the two auxiliary beams. The composite grating 9 has such construction that the radiation diffracted by this grating in the first and higher orders on the projected path of these beams reaches the information plane at a relatively large distance from the radiation spot $S_1$ and that, after reflection by the information plane and second passage through the grating 9, the said higher order radiation has a negligible influence on the desired signals.

The above-mentioned considerations relating to the apparatus using Foucault focus-error detection of course also apply to an apparatus using astigmatic focus-error detection, on the understanding that the number of radiation spots on the detection system in the last-mentioned apparatus is in principle smaller because the first grating is not subdivided.

Figure 7:
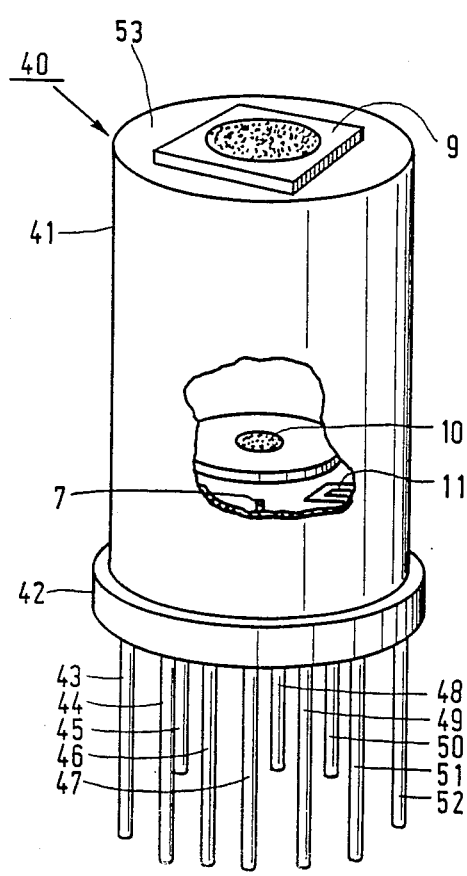

FIG. 7 shows how the different components, the diode laser 7, the first grating 9, the second grating 10 and the composite detector 11 may be positioned relative to one another in the space. The components 7, 10 and 11 may be arranged within one holder 40 with a sleeve 41 and a base plate 42. On its upper side the holder is closed by a transparent window 53 on which the first grating 9 may be arranged. The pins 43–52 on the lower side of the holder are used for the supply and control of the diode laser 7 and for receiving the signals from the different detectors. The holder 40 may be compact and have a height of the order of 10–15 mm, while the diameter may be of the order of 9–10 mm. Instead of being arranged on the window 42, the grating 9 may alternatively be incorporated in this window.

It is also possible that only the elements 7 and 11 are arranged in the housing and that the grating 10 is arranged on or in a transparent window of this housing. The grating 9 may then be connected to this housing via a ring.

Figure 8:
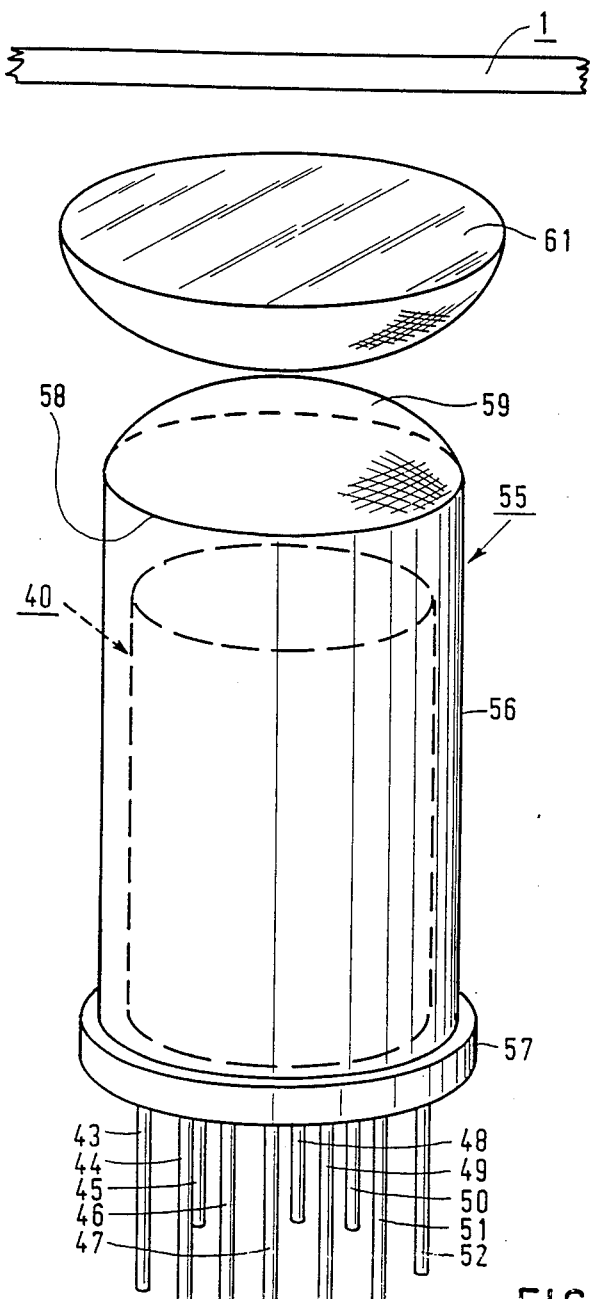

For a further integration of the different components of the scanning apparatus the holder 40 of FIG. 7 may be arranged in a second holder 55, as is shown in FIG. 8. This holder with a sleeve 56 and a bottom ring 57 is closed on its upper side by a collimator lens 59. This construction ensures the stability of the collimator lens 59 relative to the components 7, 9, 10 and 11.

The collimator lens may not only be connected to the upper side of the holder 40 by means of a holder but also by means of a ring.

Figure 9:
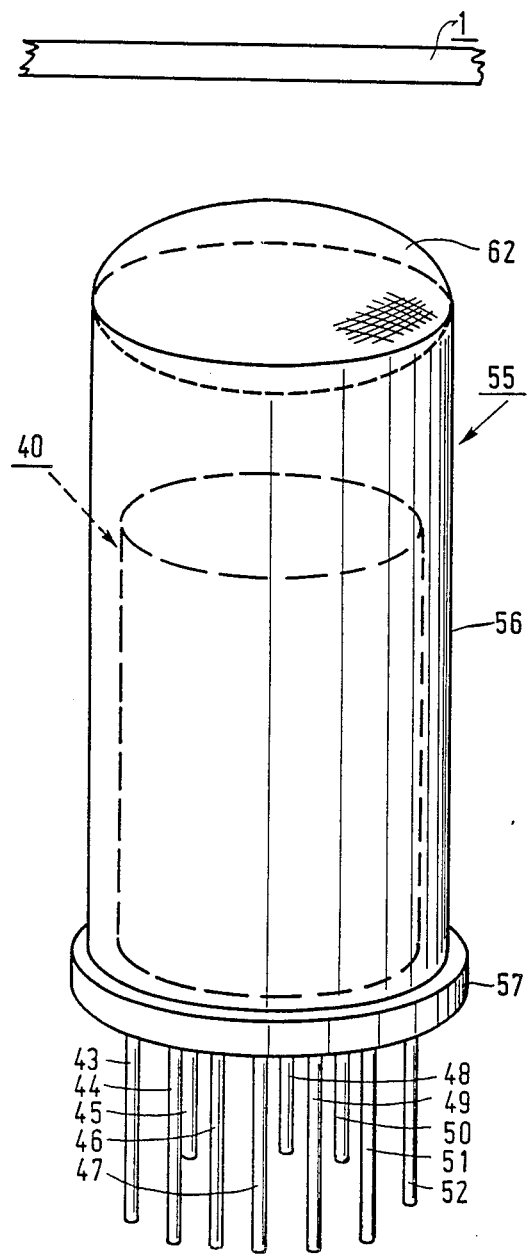

In the embodiment of FIG. 8 an objective system 61 is arranged between the collimator lens and the record carrier. A further integration is achieved if the functions of the collimator lens and the objective system are combined in one single lens, as described in U.S. Pat. No. 4,668,056 and if this single lens is arranged in the holder 55 at the position of the collimator lens 59 of FIG. 8. Such a completely integrated scanning apparatus is shown in FIG. 9, in which the combined collimator-objective lens is denoted by the reference numeral 62. This lens may also be connected to the holder 40 by means of a ring.

Figure 5:
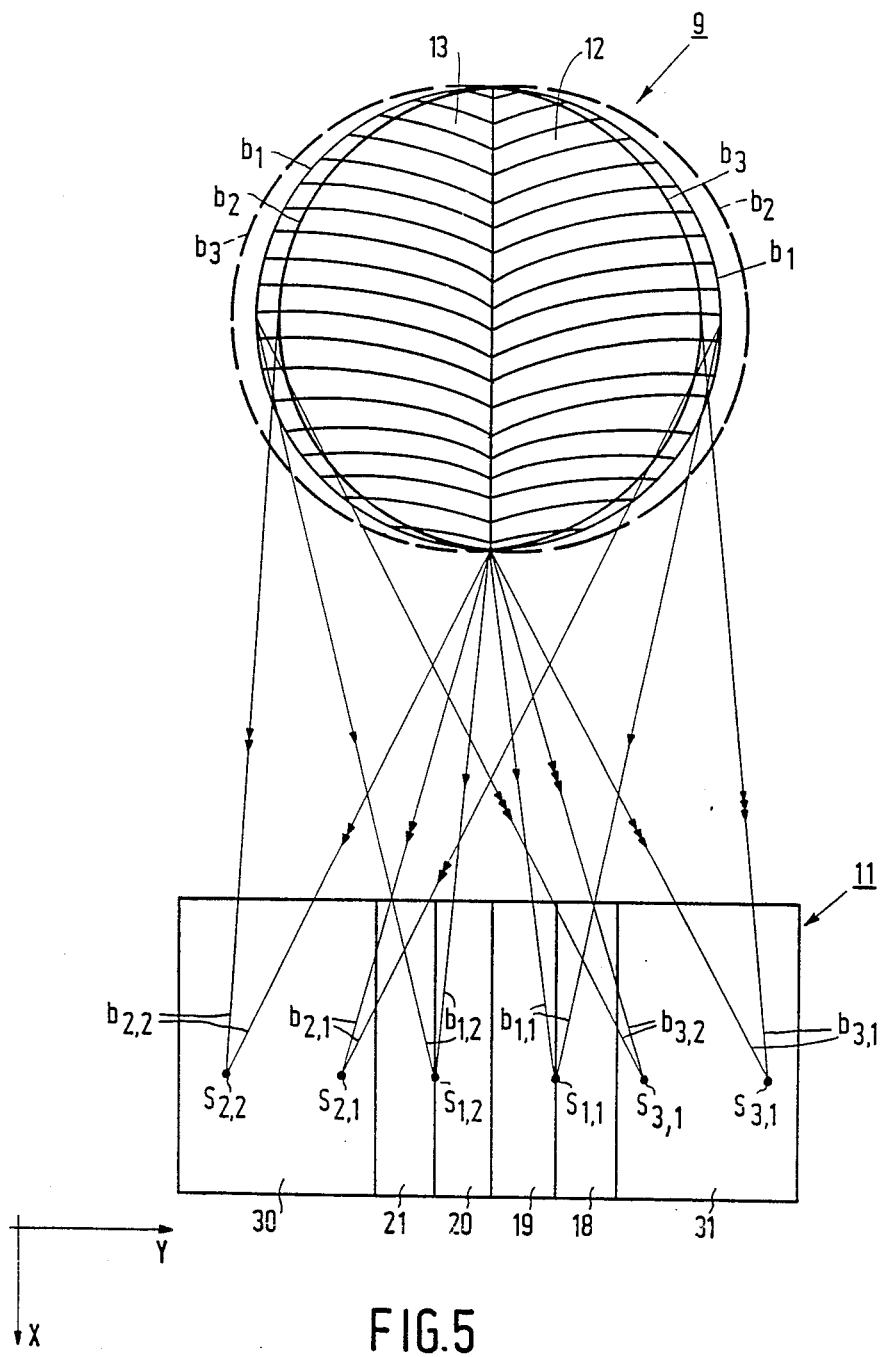
FIG. 5 shows, in a schematic form, how the scanning beam and the auxiliary beams are diffracted and split by the composite diffraction grating, and the positions of the radiation spots formed on the composite detector.
Figure 6:
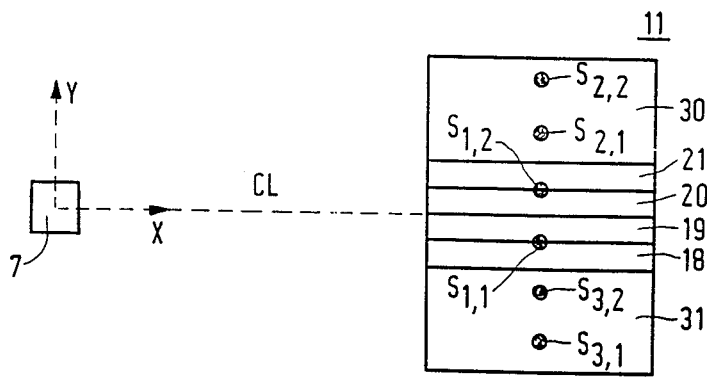
FIG. 6 shows a first embodiment of a composite detection system associated with the grating of FIG. 2, FIGS. 7, 8 and 9 show first, second and third embodiments of an integrated scanning unit according to the invention.
Figure 10:
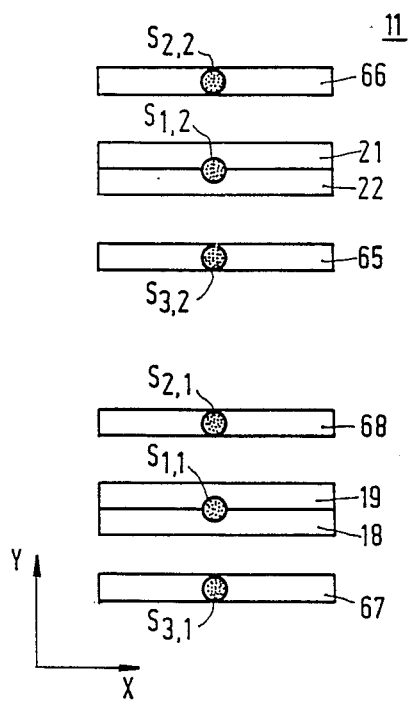
FIGS. 10 and 11 show a second and a third embodiment of a composite detection system associated with the grating of FIG. 2.

In the embodiment illustrated in FIGS. 5 and 6 in which the "Foucault radiation spots" $S_{1,1}$ and $S_{1,2}$ are located between the auxiliary spots $S_{2,1}$ and $S_{2,2}$ on the one hand and the auxiliary spots $S_{3,1}$ and $S_{3,2}$ on the other hand and which has the advantage that only one detector is required for a pair of auxiliary spots, the choice of the angle between the sub-beams $b_{1,1}$ and $b_{1,2}$ and hence the angle between the grating strips 14 and 15 is limited. FIG. 10 shows the geometry of the composite detection system of an embodiment which provides a greater choice of freedom as far as this aspect is concerned. In this embodiment, in the plane of the detection system 11, the separation which is realised by the grating 9 is larger than the separation which is realised by the grating 10. Consequently, the radiation spots $S_{1,2}$ and $S_{1,1}$ are located at a larger distance from each other than the radiation spots $S_{1,2}$, $S_{2,2}$ and $S_{3,2}$ respectively or the radiation spots $S_{1,1}$, $S_{2,1}$ and $S_{3,1}$, respectively. Separate detectors should be provided for each of the radiation spots $S_{2,2}$, $S_{2,1}$, and the radiation spots $S_{3,2}$ and $S_{3,1}$.

Figure 11:
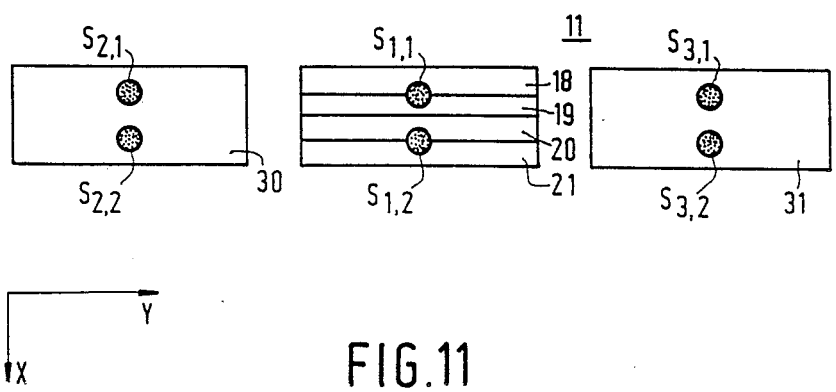

An embodiment in which only one detector is required for the radiation spots $S_{2,2}$ and $S_{2,1}$, and the radiation spots $S_{3,2}$ and $S_{3,1}$, while there is still sufficient freedom of choice of the angle between the sub-beams $b_{1,1}$ and $b_{1,2}$ is the embodiment in which the beam splitting by the grating 10 is effected in a different direction than that effected by the grating 9. This embodiment corresponds to that shown in FIG. 1 in combination with FIG. 2. FIG. 11 shows the detector geometry of this embodiment and does not need any further explanation.

Figure 12:
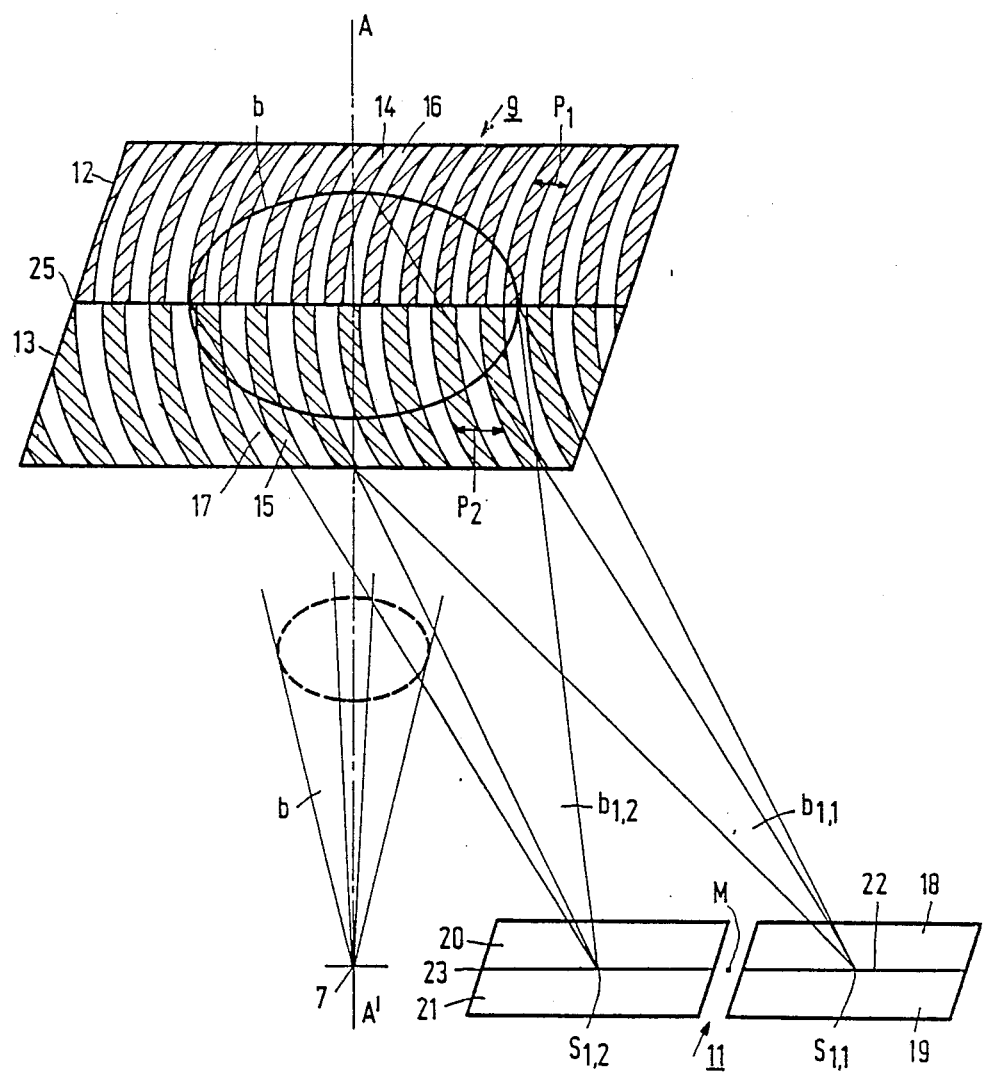
FIG. 12 shows a second embodiment of a diffraction grating for generating a focus-error signal.

Not only the composite grating of FIG. 2 but also the grating 9 shown in FIG. 12 may be used for generating a focus-error signal. This figure only shows the scanning beam $b_1$, by way of its cross-section in the plane of the grating, with its sub-beams $b_{1,1}$ and $b_{1,2}$. The main directions of the preferably curved grating strips of the two sub-gratings 12 and 13 now extend at the same angle to the bounding line 25, while the average grating periods of the two sub-gratings are different. Consequently, the angle at which the sub-beam $b_{1,2}$ is diffracted is different from the angle at which the sub-beam $b_{1,1}$ is diffracted. This means that in the plane of the detectors 18, 19, 20 and 21 the radiation spots $S_{1,1}$ and $S_{1,2}$ are displaced relative to each other in the direction of the bounding line 25.

Figure 13:
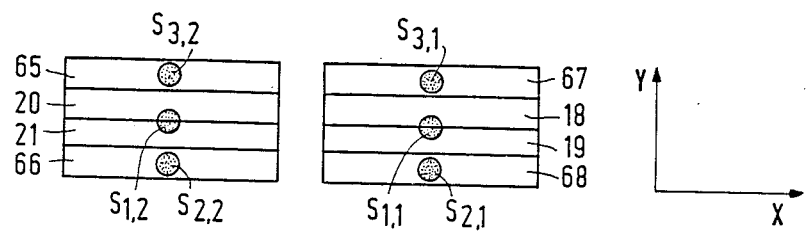
FIG. 13 shows an embodiment of the composite detection system associated with this grating.

According to the invention the grating shown in FIG. 12 can also be combined with the grating for forming two auxiliary beams. If the diffraction by the last-mentioned grating is effected in the Y direction, while the diffraction by the grating shown in FIG. 12 is effected in the X direction, the detection system has the geometry shown in FIG. 13.

Figure 14:
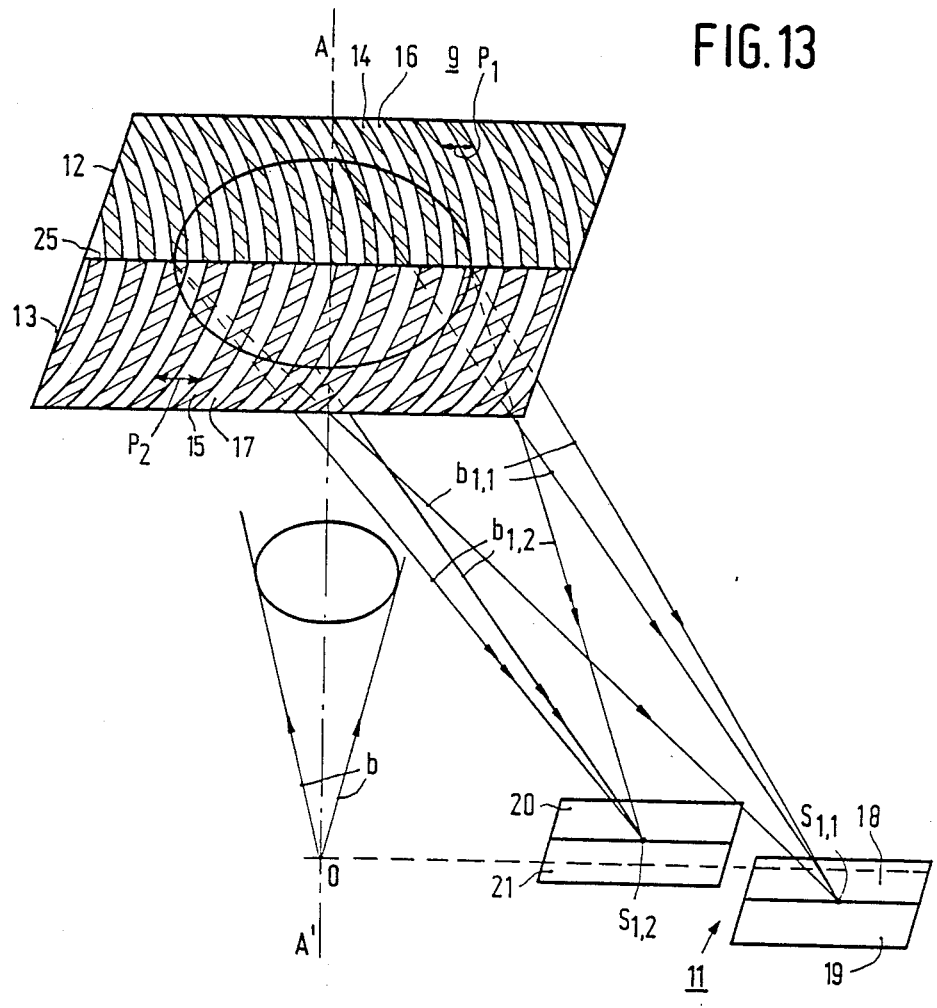
FIG. 14 shows a third embodiment of a diffraction grating for generating a focus-error signal.
Figure 15:
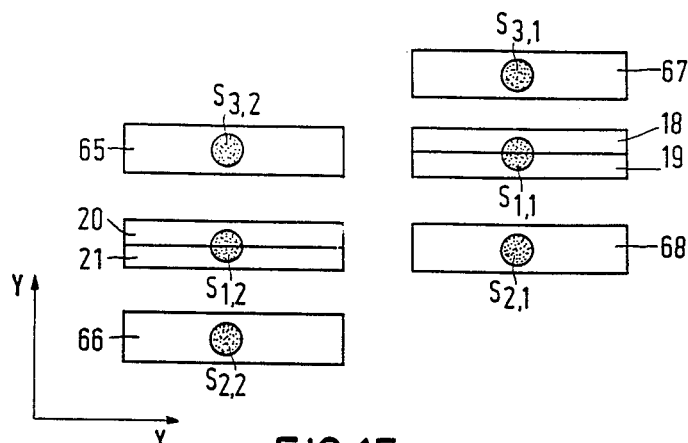
FIG. 15 shows an embodiment of the composite detection system associated with this grating.

FIG. 14 shows a third embodiment of a composite grating 9 for generating a Foucault focus-error signal. For this grating both the grating periods and the main directions of the preferably curved grating strips of the two sub-gratings 12 and 13 are different. The operation of this grating may be assumed to be a combination of that of the gratings according to FIGS. 2 and 12. Consequently, the grating of FIG. 14 diffracts the sub-beam $b_{1,1}$ in two mutually perpendicular directions through a different angle than the sub-beam $b_{1,2}$. In the plane of the composite detector 11 the radiation spots $S_{1,1}$ and $S_{1,2}$ are displaced relative to each other in two mutually perpendicular directions. If a scanning apparatus with a grating according to FIG. 14 is provided with a second grating according to the invention for forming two auxiliary beams in which the diffraction of the last-mentioned grating is effected in the Y direction, the detection system should have the geometry shown in FIG. 15.

It is to be noted that the composite diffraction grating according to FIG. 2 is preferred to that according to FIG. 12 or 14 due to its better manufacturing tolerances, adjusting facilities and stability.

The sub-gratings 12 and 13 may have straight grating strips and a constant grating period. However, a type of grating, also referred to as holograms, is preferably used which has a varying grating period, the variation in the period being, for example of the order of several percents of the average grating period. Moreover, the grating strips of the two sub-gratings are curved, as is shown in FIGS. 2, 12 and 14. Thus, these sub-gratings have a variable lens action. Due to the varying grating period the positions of the radiation spots $S_{1,1}$ and $S_{1,2}$ can be varied by displacing the grating 9 in its own plane. Aberrations in a direction perpendicular to the direction of the bounding line 25 can be minimized by the curvatures of the grating strips. The possibility of displacing the positions of the radiation spots is particularly important if an integrated laser-photodiode unit is used, i.e. a component in which the diode laser and the photodetectors are arranged on one support and are therefore fixed relative to each other and thus have a fixed mutual distance in the Z direction. This distance is subject to manufacturing tolerances and cannot be corrected during assembly of the apparatus by displacing the photodiodes relative to the laser diode in the Z direction.

In the embodiment of FIGS. 12 and 14 it can be ensured that, in spite of the different angles at which the sub-beams, inter alia $b_{1,1}$ and $b_{1,2}$ are diffracted due to the different average grating periods of the sub-gratings 12 and 13, the foci of the sub-beams are located in one plane parallel to the plane of the composite detection system, more specifically by giving the grating periods and the curvatures of the grating strips of corresponding portions of the sub-gratings a different variation.

An important advantage of the diffraction grating with curved grating strips as compared with a grating with straight grating strips is that the optical aberrations such as coma and astigmatism, which may occur when using the last-mentioned grating, can be avoided in the first-mentioned grating by taking these aberrations into account in the manufacture of this grating and by adapting the curvatures of the grating strips accordingly.

In the case of a wavelength variation of the laser beam b the angles at which the beams $b_2$ and $b_3$ and the sub-beams $b_{1,1}$, $b_{1,2}$, $b_{2,1}$, $b_{3,1}$ and $b_{3,2}$ are diffracted by the different gratings will vary. For each sub-beam this means that the position where the chief ray of this sub-beam is incident on the detection system varies. Since the intensities of radiation spots are compared for obtaining the tracking-error signal, a wavelength variation does not have any influence on this signal, provided that the detectors 30, 31; 65, 66, and 67, 68 are sufficiently large. However, the focus-error signal is obtained by detecting the displacement of the radiation spots $S_{1,1}$ and $S_{1,2}$ relative to the separating strips 22 and 23 of the associated detector pairs 18, 19 and 20, 21. Thus, an additional displacement of these radiation spots relative to the said separating strips may affect the focus-error signal. To prevent this, the separating strips in known apparatuses have such a direction that the displacement of the radiation spots $S_{1,1}$ and $S_{1,2}$ due to a wavelength variation is effected along these separating strips. The separating strips 22 and 23 then extend at such an angle, $+\Psi$ and $-\Psi$, to the connection line CL between the points M and O that the extensions of the separating strips intersect each other at the optical axis AA', as is shown in FIGS. 3a and 3b. For the sake of clarity the angles $\Psi$ are exaggerated in these figures. If the plane of the composite detection system coincides with the radiation-emitting surface of the diode laser 7, these extensions intersect each other at the point O. However, no allowance has been made for the fact that wavelength variation does not only result in a variation of the position of the radiation spots $S_{1,1}$ and $S_{1,2}$, but also in a defocusing of the sub-beams $b_{1,1}$ and $b_{1,2}$ and in an asymmetrical enlargement of the radiation spots.

Figure 16:
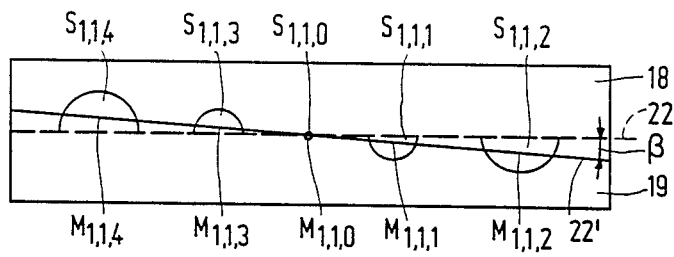
FIG. 16 shows the variation of the position of the centre of a radiation spot when focusing errors occur.

FIG. 16 illustrates how the position, the shape and the magnitude of the radiation spot $S_{1,1}$ vary in the case of wavelength variation of the scanning beam. It has been assumed that this beam is sharply focused on the information plane. $S_{1,1,0}$ is the radiation spot which is formed if the wavelength has the nominal value and if the sub-beam $b_{1,1}$ is sharply focused on the radiation-sensitive surface of the detectors 18 and 19. When increasing the wavelength, the radiation spot is displaced to the right and this spot becomes increasingly larger, which is indicated by the spots $S_{1,1,1}$, $S_{1,1,2}$. If the wavelength becomes smaller than the nominal value, the radiation spot is displaced to the left and this spot also becomes increasingly larger, which is illustrated by means of the spots $S_{1,1,3}$ and $S_{1,1,4}$. The centres of the intensity distribution of the spots $S_{1,1,0}$, $S_{1,1,1}$, $S_{1,1,2}$, $S_{1,1,3}$ and $S_{1,1,4}$ are denoted by $M_{1,1,0}$, $M_{1,1,1}$, $M_{1,1,2}$, $M_{1,1,3}$ and $M_{1,1,4}$, respectively. These centres are located on a line 22' which extends at a small angle $\alpha_1$ of the order of several degrees to the original separating strip 22 of the detectors 18 and 19. An analogous effect occurs for the radiation spot $S_{1,2}$, the line along which the centre of the intensity distribution is displaced extending at an angle to the separating strip 23 which is opposite to and has a different magnitude than the angle $\alpha_1$.

The result of a wavelength variation thus is that the centre of the intensity distribution of the radiation spot $S_{1,1}$ and $S_{1,2}$ is displaced transversely of the separating strips 22 and 23, respectively, which means that the detectors 18, 19 and 20, 21 receive different radiation intensities. The output signals of the detectors 18, 19 and 20, 21 are then no longer equal, while the scanning beam is still sharply focused on the information plane. The focus-servo system will then correct the focusing of the scanning beam, for example by displacing the objective system along the optical axis until these output signals are equal again. However, the scanning beam is then no longer nominally focused on the information plane.

It has been found that in a given embodiment of the apparatus a wavelength variation of 20 nm at a nominal wavelength of 785 nm caused a defocusing of the order of 0.7 to 0.8 $\mu$m, while the permitted total focusing error was, for example 1 $\mu$m.

Figure 17:
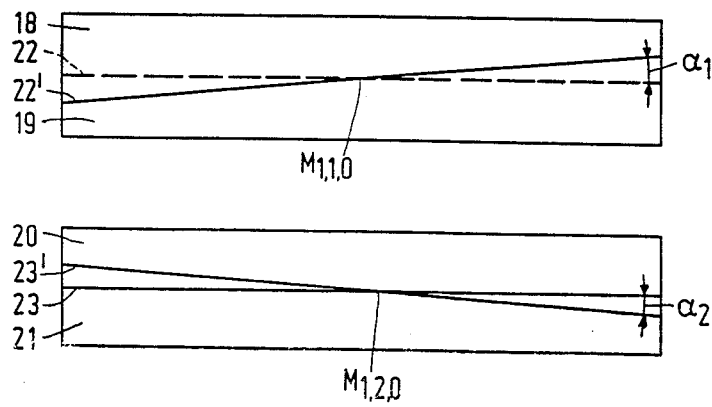
FIG. 17 shows an assembly of two detector pairs corrected for this variation.

To eliminate the influence of wavelength variations on the focus-error signal to a large extent, the separating strip for each detector pair may be positioned in such a way that the displacement of the centre of the intensity distribution of the associated radiation spot is effected along this strip. In FIG. 17 the photodiode pairs thus modified are denoted by 18, 19 and 20, 21. The new separating strips are denoted by the solid lines 22' and 23'. As compared with the original strips 22 and 23 denoted by broken lines, the strips 22' and 23' are rotated about the points $M_{1,1,0}$ and $M_{1,2,0}$ through a small angle $\alpha_1$ and $\alpha_2$, respectively.

A second possibility of correcting the wavelength variation, which possibility is preferred to that described with reference to FIGS. 16 and 17, will now be described.

If in the apparatus according to FIG. 2 the separating strips extend at an angle $\Psi$ to the connection line CL, the positions of the detector pairs in the direction of the bounding line 25 should be adjusted accurately. When varying the distance (Xd in FIG. 2) between the points M and O, the positions of the separating strips relative to the radiation spots $S_{1,1}$ and $S_{1,2}$ also vary so that such a variation will affect the focus-error signal. It is true that the positions of the radiation spots $S_{1,1}$ and $S_{1,2}$ can be corrected by displacing the grating when using a composite grating 9 with curved grating strips, but such a correction can only be carried out to a limited extent.

Moreover, when using detector pairs 18, 19; 20, 21 with oblique separating strips, scattered light, which may be produced in the apparatus by, for example false reflections, may affect the different detector signals in an unequal manner so that the focus-error signal being derived is influenced by this scattered light. Such a beam of scattered light will in fact be incident on one part, for example the left-hand part of the composite detector 11, as is illustrated by means of the broken line arc of a circle SL in FIG. 3a. The portions of the separate detectors 18, 19; 20, 21 located within this arc of a circle have different sizes so that the scattered light contributions to the detector output signals will be different for the different detectors.

Furthermore, if the separating strip 22, 23 in a detector pair 18, 19; 20, 21 is positioned in such a way that the detectors of this pair have unequal sizes, not only a first zero point which corresponds to the desired focusing may occur in the curve representing the variation of the focus-error signal as a function of the focusing error, but also a second zero point may occur which does not correspond to the desired focusing. Then there is a risk that the focus servo system of the apparatus adjusts the focus of the scanning beam above or below the information plane 2.

Figure 18:
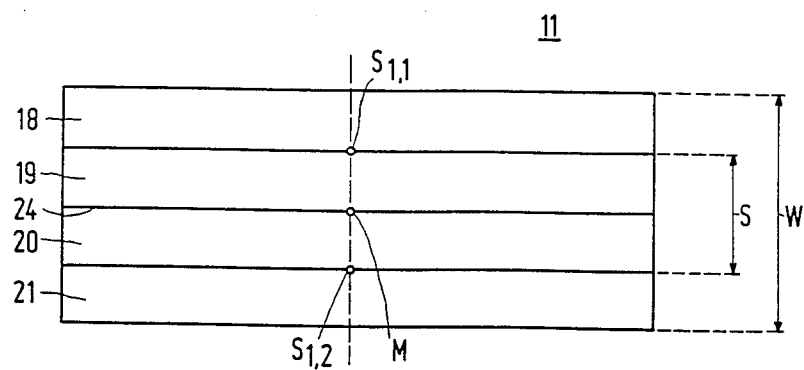
FIG. 18 shows a second, preferred embodiment of a corrected assembly of two detector pairs.

Therefore, detector pairs are preferably used which have the geometry shown in FIGS. 2, 5, 10 and 11. These detector pairs are also shown in FIG. 18. The angle $\Psi$ is now equal or substantially equal to zero; in other words, the separating strips 22 and 23 are parallel to each other and to the separating strip 24 and the connection line CL. A less stringent requirement should then be imposed on the distance between the points M and O, measured in the direction parallel to the bounding line 25. Moreover, the apparatus is then less sensitive to a tilt of the composite detector 11 about this direction.

In FIG. 18 the reference symbol W denotes the overall width of the composite detector 10 and S denotes the nominal distance between the radiation spots $S_{1,1}$ and $S_{1,2}$ in the plane of the detector 10. The nominal distance S is the distance between the positions occupied by the radiation spots $S_{1,1}$ and $S_{1,2}$ if the scanning beam is sharply focused on the information plane 2. The two detector pairs 18, 19 and 20, 21 can be arranged against each other but also at some distance from each other, as is shown in FIG. 2. The following considerations play a role in the design of the detector pairs.

With a view to optimum detector signals, it is desirable for the different detectors to have the same size. If the detector pairs are arranged against each other, this means that W=2S. The values of W and S are the result of a compromise. On the one hand, the overall width of the detector pairs should be as small as possible in order that a minimum possible quantity of scattered light will reach these detector pairs. On the other hand, W should be as large as possible in order that the focus-error detection system has a maximum possible capture range. For S it holds that its value should not be too small because interference phenomena may then occur between the radiations of the radiation spots $S_{1,1}$ and $S_{1,2}$. In fact, these spots are not punctiform, sharply defined spots but are somewhat extended with an intensity decreasing from the centre to the exterior. On the other hand S should not be too large because later on, in the further design of the apparatus, it may appear that such displacements in, for example the X and Y directions of optical elements, for example the grating 9 should be carried out that aberrations may occur, resulting in the slope of the focus-error signal curve around zero becoming smaller.

An advantage of the detector pairs with parallel separating strips may be that these can more easily be made with the required accuracy, particularly with respect to the distance S, as compared with detector pairs having oblique separating strips.

Also in a scanning apparatus comprising the composite gratings shown in FIGS. 12 and 14 the focus-error signal may be independent of the laser beam wavelength variation to a great extent which is acceptable in practice, if the separating strips 22 and 23 of the detector pairs (FIGS. 13 and 15, respectively) are parallel to each other ($\Psi=0$). If it is desired under circumstances to even further reduce this dependence, the separating lines 22 and 23 can be positioned at a very small angle $\Psi$, of the order of 0.1° and considerably smaller than this angle $\Psi$ in known apparatuses, to the connection line CL between the points M and O.

Figure 19:
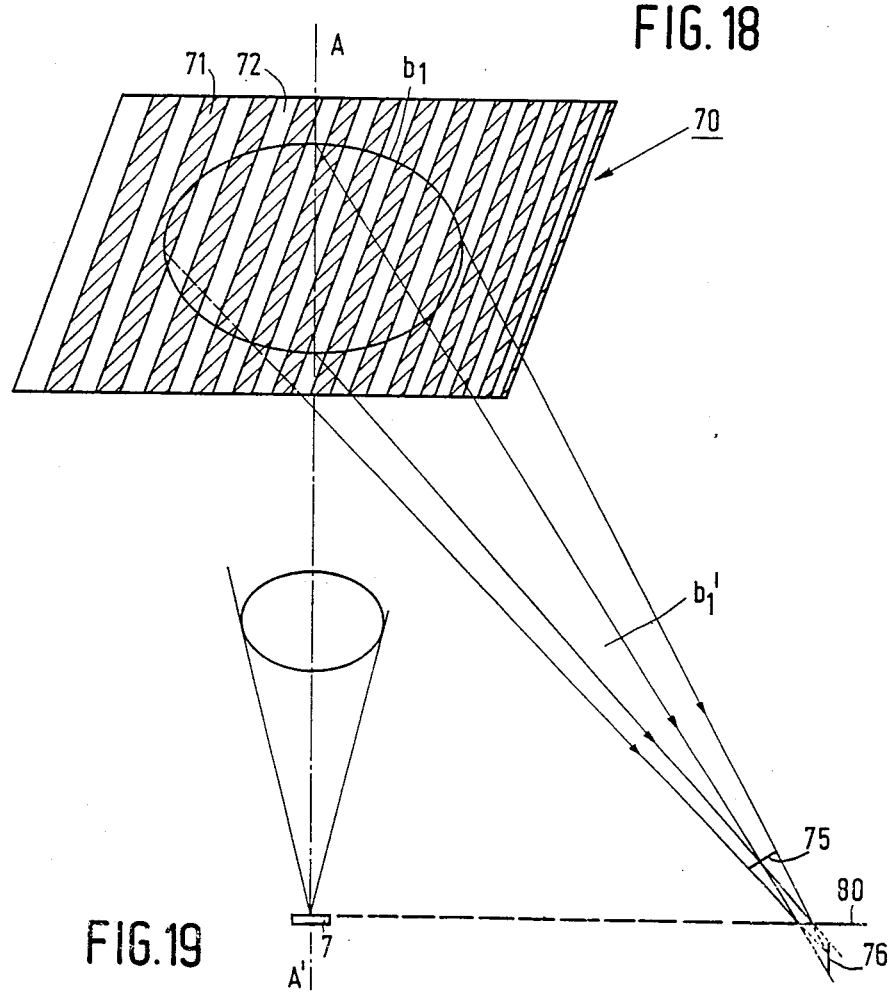
FIG. 19 shows a first embodiment of an astimatic grating for generating a focus-error signal.

FIG. 19 shows a grating 70 which converts the reflected scanning beam $b_1$ into an astigmatic beam $b_1'$. This grating has straight grating strips 71 and a linearly varying grating period. The grating is dimensioned in such a way that the radiation of the beam b is diffracted largely in one order, for example the +1 order. The first-order beam $b'_1$ is no longer focused in one point but in two mutually perpendicular focal lines 75 and 76, the line 75 being located at a position where the beam $b'_1$ would be focused if the grating were not astimatic. When a focusing error occurs, the focal lines 75 and 76 are displaced simultaneously in the same direction and over the same distance. A so-called four-quadrant detector 80 is arranged in a plane approximately halfway between the positions the astigmatic focal lines, occupy if the scanning beam is sharply focused on the information plane. This detector, shown in FIG. 20, comprises four detectors 81, 82, 83 and 84 which are arranged in four different quadrants around the chief ray h of the diffracted beam $b'_1$. If the scanning beam is sharply focused on the information plane 2, the radiation spot $S'_1$ formed by the beam $b'_1$ in the plane of the detectors is round, as is illustrated by the solid line circle in FIG. 20. If a focusing error occurs, the radiation spot $S'_1$ is deformed to an elliptical spot, as is illustrated by the broken line ellipses in FIG. 20. The major axis of the ellipse extends at an angle of 45° to the separating strips 85 and 86, the sign of the angle being determined by the focus-error sign. If the signals of the detectors 81, 82, 83 and 84 are represented by $S_{81}$, $S_{82}$, $S_{83}$ and $S_{84}$, the focus-error signal $S_f$ will be given by:

$$S_f = (S_{81} + S_{83}) - (S_{82} + S_{84}).$$

If a second grating (10 in FIG. 1) for forming two auxiliary beams $b_2$ and $b_3$ is arranged in a scanning apparatus with such an astigmatic grating 70, the composite detection system should have the geometry shown in FIG. 20. One undivided detector 87, 88 is associated with each radiation spot $S'_2$ and $S'_3$, respectively, formed by the reflected auxiliary beams $b_2$ and $b_3$. It has been assumed that the grating strips of the second grating 10 are substantially transverse to the track direction, thus extend in the X direction, and that the grating strips of the grating 70 extend in the Y direction. It is also possible for the grating strips of both the grating 9 and the grating 10 to be transverse and substantially transverse to the effective track direction.

In the apparatus according to FIGS. 19 and 20 the separating strips 85 and 86 extend at an angle of 45° to the effective track direction. When a tracking error occurs, the centre of gravity of the intensity distribution of the radiation spot $S_1'$ is displaced to the left or the right in the X direction. As a result, a tracking error may effect the focus-error signal.

This can be prevented by using a different, holographic embodiment of the astigmatic grating 9 which is shown in a plan view in FIG. 21. This grating has a non-linearly varying grating period and curved grating strips 71. The grating parameters, inter alia the curvatures of the grating strips, may be chosen to be such that the astigmatic focal lines of the scanning beam $b_1'$ passing through this grating are rotated through 45° relative to these lines in FIG. 19. As is shown in FIG. 22, the separating strips 85 and 86 of the four-quadrant detector can then be rotated through 45° relative to these separating strips in FIG. 20 and may thus be parallel or perpendicular to the track direction. A tracking error now results in the quantity of radiation on the detectors 81 and 84 increasing or decreasing relative to the quantity of radiation on the detectors 82 and 83. Since the signals of the detectors 81 and 84 as well as those of the detectors 82 and 83 are subtracted from each other for determining the focusing error, a tracking error does not have any influence on the focus-error signal.

In this description it has so far been assumed that the gratings 9 and 10 are radiation-transparent. However, it is alternatively possible for one or both of these gratings to be reflecting. This provides the possibility of giving the scanning apparatus a greater compactness because the radiation path is folded. The scanning apparatus using one or two reflecting gratings can be formed analogously as described above with reference to the different embodiments using radiation-transparent gratings, as far as focus-error detection method, construction of the gratings, orientation direction of the grating strips, the orientations of the gratings relative to each other and the detector geometry are concerned.

Figure 23:
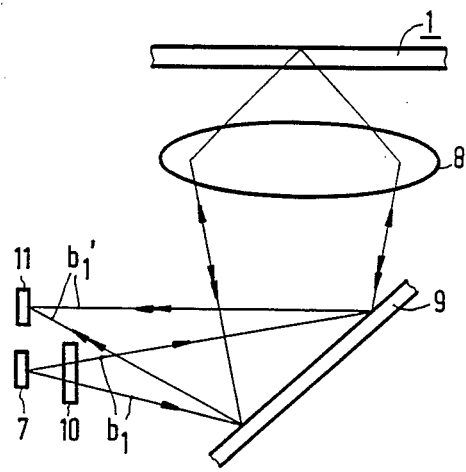
FIG. 23 shows an embodiment of a scanning apparatus having a reflecting first grating.
Figure 24:
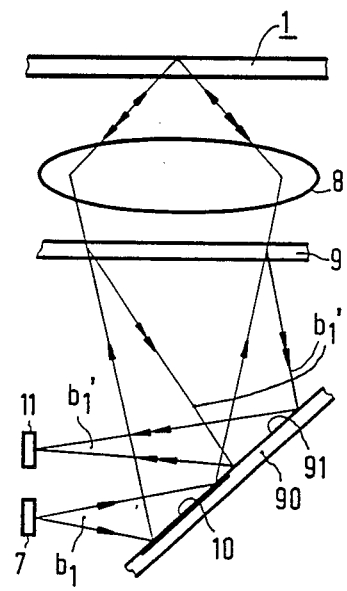
FIG. 24 shows an embodiment of a scanning apparatus having a reflecting second grating.
Figure 25:
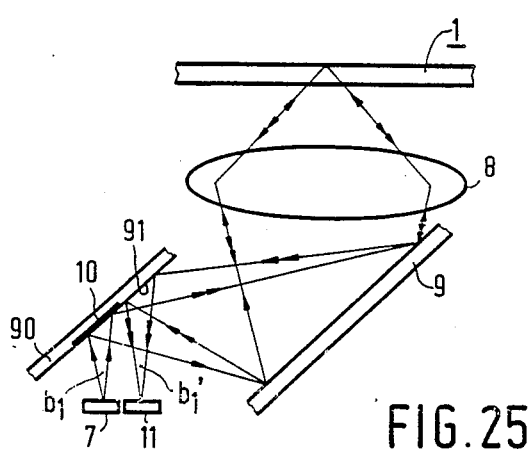
FIG. 25 shows an embodiment of a scanning apparatus having a reflecting first and second grating.

FIGS. 23, 24 and 25 show diagrammatically how the first diffraction grating 9 causing astigmatism or beam splitting and the second diffraction grating 10 forming auxiliary beams can be arranged in the radiation path between the radiation source 7 and the record carrier 1. In these figures the reference numeral 11 again denotes the radiation-sensitive detection system and 8 denotes the objective system. For the sake of simplicity only the scanning beam $b_1$ and only one beam $b_1'$ from the grating 9 are shown. The two auxiliary beams from the grating 9, which are not shown, have the same orientation relative to the beams $b_1$ and $b_1'$, which are shown, as described above with reference to the embodiments using radiation-transparent gratings.

In the apparatus according to FIG. 23 the first grating 9 is reflecting and the second grating 10 is radiation-transparent. The portion of the radiation path between the radiation source 7 and the grating 9 now extends in a horizontal direction so that the height of the scanning apparatus is reduced.

In FIG. 24 the second grating 10 is reflecting and the grating 9 is radiation-transparent. The grating 10 is arranged on a plate 90 whose portion 91 next to the grating 10 is also reflecting. The beam $b_1'$ reflected by the record carrier 1 and diffracted by the grating 9 is reflected to the radiation-sensitive detection system 11 by the reflecting portion 91. In principle, the apparatus according to FIG. 24 has also a smaller height than the scanning apparatus using radiation-transparent gratings.

FIG. 25 shows a scanning apparatus in which both gratings 9 and 10 are radiation reflecting so that the radiation path is doubly folded and the height of the apparatus is even smaller than that of the apparatuses according to FIGS. 23 and 24. Here again the second grating 10 is arranged on a plate 90 having, next to this grating, a reflecting portion 91 which reflects the beam $b_1'$ reflected by the record carrier and diffracted by the grating 9 to the detection system 11.

The invention has been described for use in a read apparatus, but it may alternatively be used in a write apparatus or in a combined write-read apparatus in which during recording the focusing and the tracking of the write beam are monitored. The focus-error and tracking-error detection systems described do not utilize special properties of the information surface 2. It is merely necessary and adequate that this surface is reflecting and has a track structure. Therefore, the invention may be used in various apparatuses in which a very accurate read-out is required, for example in microscopes.

We claim:

1. An apparatus for optically scanning a radiation-reflecting information plane, which apparatus comprises a radiation source supplying a scanning beam, an objective system for focusing the scanning beam to a scanning spot in the information plane and for re-imaging the scanning spot on a composite radiation-sensitive detection system, and a first diffraction element arranged in the radiation path between the radiation source and the objective system for deflecting a part of the radiation reflected by the information plane to the radiation-sensitive detection system and for deforming the deflected scanning beam in such a way that a focus-error signal can be derived therefrom by means of the composite detection system, characterized in that a second, single diffraction element is arranged between the radiation source and the first diffraction element for splitting the beam supplied by the radiation source into a scanning beam and two auxiliary beams which form the scanning spot and the two auxiliary spots, respectively, in the information plane, in that the composite detection system comprises extra detectors for the re-imaged auxiliary spots and in that the second diffraction element is so small and is arranged at such position that the beams diffracted by the first diffraction element do not reach the second diffraction element.

2. An apparatus as claimed in claim 1, characterized in that the two diffraction elements are radiation-transmissive.

3. An apparatus as claimed in claim 1, characterized in that at least one of the two diffraction elements is a reflecting element.

4. An apparatus as claimed in claim 3, characterized in that the first diffraction element is reflecting and the second diffraction element is radiation-transmissive.

5. An apparatus as claimed in claim 3, characterized in that the first diffraction element is radiation-transmissive and the second diffraction element is reflecting.

6. An apparatus as claimed in claim 3, characterized in that both the first and the second diffraction element are reflecting.

7. An apparatus as claimed in claim 6, in which the radiation source is a diode laser and the radiation-sensitive detection system comprises a composite photodiode, and in which the laser diode and the photodiode are arranged on one side of a housing, which housing has a radiation window at the opposite side, characterized in that the second diffraction element is incorporated in the housing and in that the first diffraction element is fixedly connected to the radiation-transmissive side of the housing.

8. An apparatus as claimed in claim 7, characterized in that a collimator lens is fixedly connected to the housing.

9. An apparatus as claimed in claim 7, characterized in that an objective system in the form of a single objective lens is fixedly connected to the housing.

10. An apparatus as claimed in any one of claims 1-9, characterized in that the second diffraction element is a diffraction grating having a constant grating period and whose grating strips are substantially transverse to the effective track direction, in that the first diffraction element is a diffraction grating having a varying grating period and in that the composite detection system comprises four detectors which are arranged in four different quadrants around the chief ray of the scanning beam deflected by the first diffraction grating, the shape of the re-imaged scanning spot being determined by means of said detectors.

11. An apparatus as claimed in claim 10, characterized in that the first grating has straight grating strips and a linearly varying grating period.

12. An apparatus as claimed in claim 10, characterized in that the grating strips of the first grating are curved and in that the separating strips of the four-quadrant detector are parallel and are substantially transverse to the effective track direction.

13. An apparatus as claimed in any one of claims 1-9, characterized in that the second diffraction element is a diffraction grating having a constant grating period and whose grating strips are substantially transverse to the effective track direction, in that the first diffraction element is a composite grating comprising two sub-gratings and splitting the deflected scanning beam into two sub-beams, and in that the composite detection system comprises two detector pairs, a first and a second sub-beam cooperating with a first and a second detector pair, respectively.

14. An apparatus as claimed in claim 13, characterized in that the sub-gratings have a varying grating period and in that the grating strips of the sub-gratings are curved.

15. An apparatus as claimed in claim 13, characterized in that the grating strips of the one sub-grating have the same main direction as those of the other sub-grating, in that the average grating periods of the sub-gratings are different, and in that the detector pairs are juxtaposed in a direction parallel to the bounding line between the sub-gratings.

16. An apparatus as claimed in claim 13, characterized in that the sub-gratings have the same average grating period, in that the main directions of the grating strips of the one sub-grating extend at a first angle and those of the other sub-grating extend at a second angle to the bounding line of the two sub-gratings, and in that the detector pairs are juxtaposed in a direction transversely of the direction of the said bounding line.

17. An apparatus as claimed in claim 13, characterized in that the main directions of the grating strips of the first sub-grating extend at a first angle and those of the grating strips of the second sub-grating extend at a second angle to the bounding line between the sub-gratings, in that the average grating periods of the two sub-gratings are different and in that the detector pairs occupy different positions both in a direction parallel to and in a direction perpendicular to the said bounding line.

18. An apparatus as claimed in claim 11, in which one detector is provided for each deflected auxiliary beam, characterized in that the two detectors are located on either side of the four-quadrant detector, viewed in the direction transverse to the effective track direction.

19. An apparatus as claimed in claim 16, characterized in that in the composite detection system, viewed in the direction transverse to the effective track direction, a first and a second detector for receiving the first and the second auxiliary beam are located on a first and a second side, respectively, of the two juxtaposed detector pairs.

20. An apparatus as claimed in claim 16, characterized in that in the composite detection system a first and second, and a third and fourth detector are provided for the first and second auxiliary beams, respectively, which are each split into two sub-beams by the first diffraction grating, and in which, viewed in the direction transverse to the effective track direction, the four detectors and the two detector pairs are juxtaposed in the sequence: first detector, first detector pair, third detector, second detector, second detector pair and fourth detector.

21. An apparatus as claimed in claim 16, characterized in that the grating strips of the first diffraction grating are substantially parallel to those of the second diffraction grating and in that, viewed in the effective track direction, a first detector for the first auxiliary beam and a second detector for the second auxiliary beam are located on different sides of the two detector pairs, which pairs are juxtaposed, viewed in the direction transverse to the effective track direction.

22. An apparatus as claimed in claim 17, characterized in that in the composite detection system a first and second, and a third and fourth detector are provided for the first and second auxiliary beams, respectively, which are each split into two auxiliary sub-beams by the first diffraction grating, and in which, viewed in directions transverse to the effective track direction, the first and third detectors are located on either side of the first detector pair and the second and fourth detectors are located on either side of the second detector pair.

23. An apparatus as claimed in claim 15, characterized in that in the composite detection system a first and second, and a third and fourth detector are provided for the first and second auxiliary beams, respectively, which are each split into two auxiliary sub-beams by the first diffraction grating, and in which, viewed in directions transverse to the effective track direction, the first and third detectors are located on either side of the first detector pair and the second and fourth detectors are located on either side of the second detector pair.

24. An apparatus as claimed in claims 18, characterized in that for each detector pair the separating strip between the two detectors extends at an acute angle to the line connecting the centre of the radiation-emitting surface of the diode laser to the position occupied by the centre of the intensity distribution of the radiation spot formed on the relevant detector pair when the scanning beam is focused on the information plane to an optimum degree.

25. An apparatus as claimed in claims 18, characterized in that the separating strips of the two detector pairs are substantially parallel to a line connecting the centre of the radiation-emitting surface of the diode laser to the centre of the composite radiation-sensitive detection system.

26. An apparatus as claimed in claim 14, characterized in that the grating strips of the one sub-grating have the same main direction as those of the other sub-grating, in that the average grating periods of the sub-gratings are different, and in that the detector pairs are juxtaposed in a direction parallel to the bounding line between the sub-gratings.

27. An apparatus as claimed in claim 14, characterized in that the sub-gratings have the same average grating period, in that the main directions of the grating strips of the one sub-grating extend at a first angle and those of the other sub-grating extend at a second angle to the bounding line of the two sub-gratings, and in that the detector pairs are juxtaposed in a direction transversely of the direction of said bounding line.

28. An apparatus as claimed in claim 14, characterized in that the main directions of the grating strips of the first sub-grating extend at a first angle and those of the grating strips of the second sub-grating extend at a second angle to the bounding line between the two sub-gratings, in that the average grating periods of the two sub-grating are different and in that the detector pairs occupy different positions both in a direction parallel to and in a direction perpendicular to the said bounding line.

29. An apparatus as claimed in claim 12, in which one detector is provided for each deflected auxiliary beam, characterized in that the two detectors are located on either side of the four-quadrant detector, viewed in the direction traverse to the effective track direction.

30. An apparatus as claimed in claim 27, characterized in that in the composite detection system, viewed in the direction transverse to the effective track direction, a first and a second detector for receiving the first and the second auxiliary beam are located on a first and a second side, respectively, of the two juxtaposed detector pairs.

31. An apparatus as claimed in claim 27, characterized in that in the composite detection system a first and second, and a third and fourth detector are provided for the first and second auxiliary beams, respectively, which are each split into two sub-beams by the first diffraction grating, and in which, viewed in the direction transverse to the effective track direction, the four detectors and the two detector pairs are juxtaposed in the sequence: first detector, first detector pair, third detector, second detector, second detector pair and fourth detector.

32. An apparatus as claimed in claim 27, characterized in that the grating strips of the first diffraction grating are substantially parallel to those of the second diffraction grating and in that, viewed in the effective track direction, a first detector for the first auxiliary beam and a second detector for the second auxiliary beam are located on different sides of the two detector pairs, which pairs are juxtaposed viewed in the direction transverse to the effective track direction.

33. An apparatus as claimed in claim 28, characterized in that in the composite detection system a first and second, and a third and fourth detector are provided for the first and second auxiliary beams, respectively, which are each split into two auxiliary sub-beams by the first diffraction grating, and in which, viewed in directions traverse to the effective track direction, the first and third detectors are located on either side of the first detector pair and the second and fourth detectors are located on either side of the second detector pair.

34. An apparatus as claimed in claim 26, characterized in that in the composite detection system a first and second, and a third and fourth detector are provided for the first and second auxiliary beams, respectively, which are each split into two auxiliary sub-beams by the first diffraction grating, and in which, viewed in directions transverse to the effective track direction, the first and third detectors are located on either side of the first detector pair and the second and fourth detectors are located on either side of the second detector pair.

35. An apparatus as claimed in claim 29, characterized in that for each detectors pair the separating strip between the two detectors extends at an acute angle to the line connecting the center of the radiation-emitting surface of the diode laser to the position occupied by the center of the intensity distribution of the radiation spot formed on the relevant detector pair when the scanning beam is focused on the information plane to an optimum degree.

36. An apparatus as claimed in claim 29, characterized in that the separating strips of the two detector pairs are substantially parallel to a line connecting the center of the radiation-emitting surface of the diode laser to the center of the composite radiation-sensitive detection system.

* * * * *